(12) United States Patent
Karabatis et al.

(10) Patent No.: US 11,483,294 B2
(45) Date of Patent: Oct. 25, 2022

(54) METHOD FOR ANONYMIZING NETWORK DATA USING DIFFERENTIAL PRIVACY

(71) Applicant: UNIVERSITY OF MARYLAND BALTIMORE COUNTY, Baltimore, MD (US)

(72) Inventors: George Karabatis, Ellicott City, MD (US); Zhiyuan Chen, Ellicott City, MD (US); Ahmed Aleroud, Irbid (JO); Fan Yang, Catonsville, MD (US)

(73) Assignee: UNIVERSITY OF MARYLAND, BALTIMORE COUNTY, Baltimore, MD (US)

( * ) Notice: Subject to any disclaimer, the term of this patent is extended or adjusted under 35 U.S.C. 154(b) by 0 days.

(21) Appl. No.: 17/083,290

(22) Filed: Oct. 28, 2020

(65) Prior Publication Data

US 2021/0336938 A1    Oct. 28, 2021

Related U.S. Application Data

(60) Provisional application No. 62/892,726, filed on Aug. 28, 2019.

(51) Int. Cl.
*G06F 21/00* (2013.01)
*H04L 9/40* (2022.01)
*G06F 21/62* (2013.01)

(52) U.S. Cl.
CPC ...... *H04L 63/0421* (2013.01); *G06F 21/6263* (2013.01); *H04L 63/1475* (2013.01)

(58) Field of Classification Search
None
See application file for complete search history.

(56) References Cited

U.S. PATENT DOCUMENTS

| | | | |
|---|---|---|---|
| 6,671,830 B2 | 12/2003 | Kaler et al. | |
| 8,069,210 B2 * | 11/2011 | Gillum | H04L 51/212 |
| | | | 709/224 |
| 8,332,860 B1 | 12/2012 | Yahalom et al. | |
| 8,341,104 B2 | 12/2012 | Manickam et al. | |
| 8,418,249 B1 * | 4/2013 | Nucci | G06F 21/552 |
| | | | 709/225 |
| 8,898,272 B1 | 11/2014 | Young et al. | |
| 8,935,389 B2 | 1/2015 | Pedigo et al. | |
| 9,501,322 B2 | 11/2016 | Yahalom et al. | |
| 10,061,807 B2 | 8/2018 | Marquardt et al. | |
| 10,254,934 B2 | 4/2019 | Chauhan et al. | |

(Continued)

*Primary Examiner* — Maung T Lwin
(74) *Attorney, Agent, or Firm* — Juneau & Mitchell; Todd L. Juneau

(57) ABSTRACT

The invention described herein is directed to methods and systems for protecting network trace data. Network traces are used for network management, packet classification, traffic engineering, tracking user behavior, identifying user behavior, analyzing network hierarchy, maintaining network security, and classifying packet flows. In some embodiments, network trace data is protected by subjecting network trace data to data anonymization using an anonymization algorithm that simultaneously provides sufficient privacy to accommodate the organization need of the network trace data owner, provides acceptable data utility to accommodate management and/or network investigative needs, and provides efficient data analysis, at the same time.

2 Claims, 14 Drawing Sheets

Cluster-based differential privacy anonymization example

(56) References Cited

U.S. PATENT DOCUMENTS

| | | | |
|---|---|---|---|
| 10,275,600 B2 | 4/2019 | Wysopal et al. | |
| 10,521,498 B2 | 12/2019 | Pereira Filho et al. | |
| 10,628,603 B1 | 4/2020 | de Boer et al. | |
| 10,628,771 B1 | 4/2020 | Sicilia et al. | |
| 10,776,194 B2 | 9/2020 | Bath et al. | |
| 10,778,712 B2 | 9/2020 | Chauhan et al. | |
| 10,855,657 B2 | 12/2020 | Senftleber et al. | |
| 10,855,793 B2 | 12/2020 | Mungel et al. | |
| 10,942,946 B2 | 3/2021 | Oliner et al. | |
| 10,977,159 B2 | 4/2021 | Baer et al. | |
| 2008/0162929 A1* | 7/2008 | Ishikawa | H04L 9/0833 |
| | | | 713/160 |
| 2009/0070295 A1 | 3/2009 | Otomori et al. | |
| 2011/0083013 A1* | 4/2011 | Nice | G06F 21/6263 |
| | | | 713/168 |
| 2012/0023444 A1* | 1/2012 | Patil | H04N 21/8355 |
| | | | 715/810 |
| 2012/0151601 A1* | 6/2012 | Inami | G06T 1/00 |
| | | | 726/26 |
| 2013/0073591 A1 | 3/2013 | Rolia et al. | |
| 2013/0152158 A1 | 6/2013 | Yoshihama | |
| 2014/0310231 A1 | 10/2014 | Sampathkumaran et al. | |
| 2015/0040217 A1 | 2/2015 | Abuelsaad et al. | |
| 2015/0067654 A1 | 3/2015 | Seto et al. | |
| 2015/0106324 A1 | 4/2015 | Puri et al. | |
| 2015/0172400 A1 | 6/2015 | Sarfati et al. | |
| 2016/0026720 A1 | 1/2016 | Lehrer et al. | |
| 2016/0196201 A1 | 7/2016 | Seto et al. | |
| 2016/0253340 A1 | 9/2016 | Barth et al. | |
| 2016/0316723 A1 | 11/2016 | Wall et al. | |
| 2017/0083585 A1 | 3/2017 | Chen et al. | |
| 2017/0085447 A1 | 3/2017 | Chen et al. | |
| 2017/0140158 A1* | 5/2017 | Gou | H04L 63/1441 |
| 2017/0213272 A1 | 7/2017 | Mowatt et al. | |
| 2017/0220633 A1 | 8/2017 | Porath et al. | |
| 2017/0373935 A1 | 12/2017 | Subramanian et al. | |
| 2018/0069899 A1 | 3/2018 | Lang et al. | |
| 2018/0089286 A1 | 3/2018 | Marquardt et al. | |
| 2018/0173894 A1* | 6/2018 | Boehler | G06F 21/6254 |
| 2018/0211033 A1* | 7/2018 | Aditham | G06F 21/316 |
| 2018/0218057 A1 | 8/2018 | Beckham et al. | |
| 2018/0322279 A1* | 11/2018 | Beskorovajnov | G06F 21/552 |
| 2018/0349482 A1 | 12/2018 | Oliner et al. | |
| 2018/0365610 A1 | 12/2018 | Klett et al. | |
| 2019/0095241 A1 | 3/2019 | Ago et al. | |
| 2019/0095478 A1 | 3/2019 | Tankersley et al. | |
| 2019/0095599 A1 | 3/2019 | Iliofotou et al. | |
| 2019/0166145 A1 | 5/2019 | Chauhan et al. | |
| 2019/0372941 A1* | 12/2019 | Mohammady | H04W 12/02 |
| 2020/0034566 A1* | 1/2020 | Zhang | G06Q 50/01 |
| 2020/0065521 A1 | 2/2020 | Durvasula et al. | |
| 2020/0104402 A1 | 4/2020 | Burnett et al. | |
| 2020/0125547 A1 | 4/2020 | Mathew | |
| 2020/0137097 A1 | 4/2020 | Zimmermann et al. | |
| 2020/0311296 A1* | 10/2020 | Kim | G06F 16/24535 |
| 2020/0328961 A1 | 10/2020 | Puri et al. | |
| 2021/0037037 A1 | 2/2021 | Tolaney et al. | |

\* cited by examiner

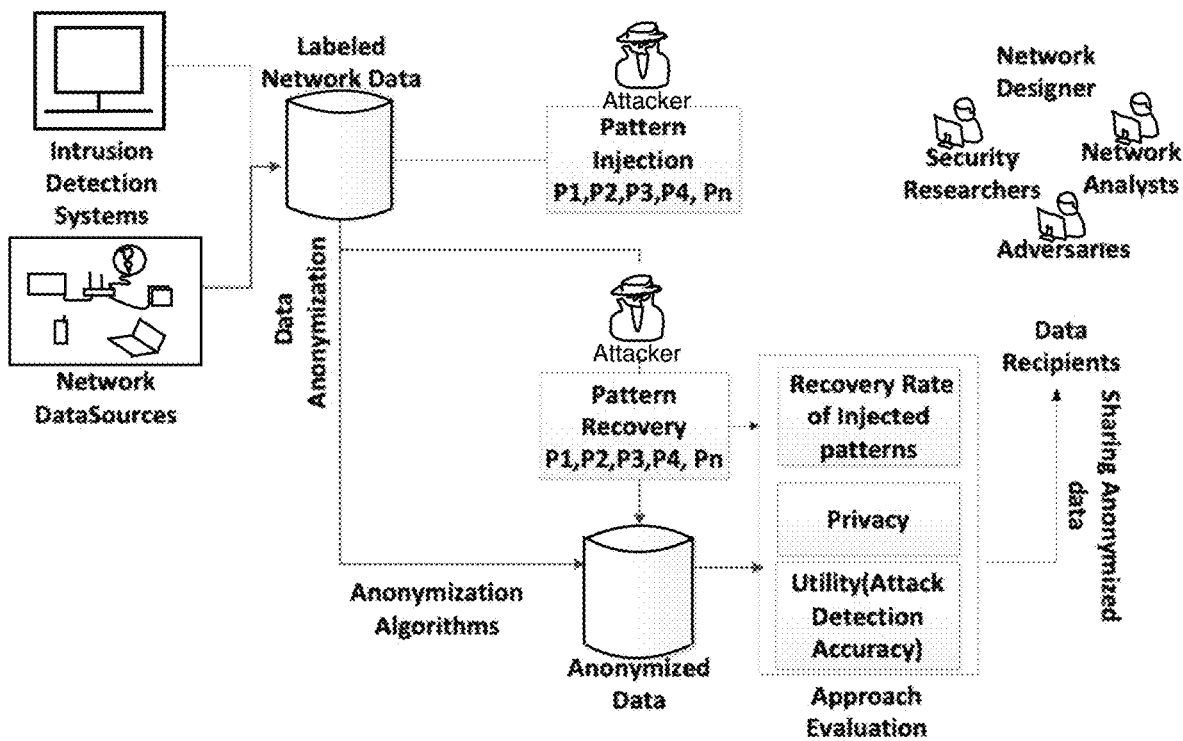
Fig. 1. Research approach and overall system architecture

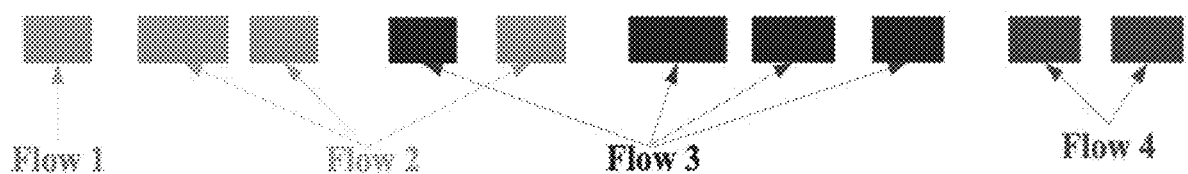
Fig. 2. Packet aggregation to create flows.

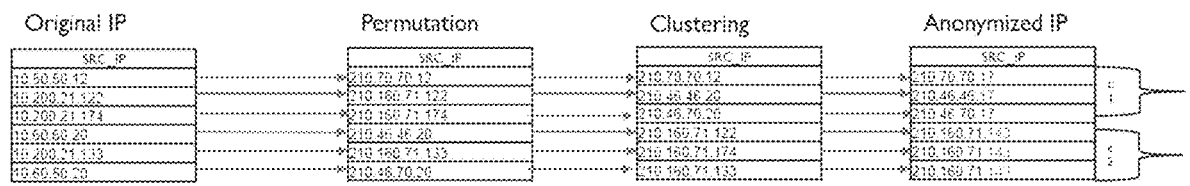
Fig. 3. Anonymization of IP addresses

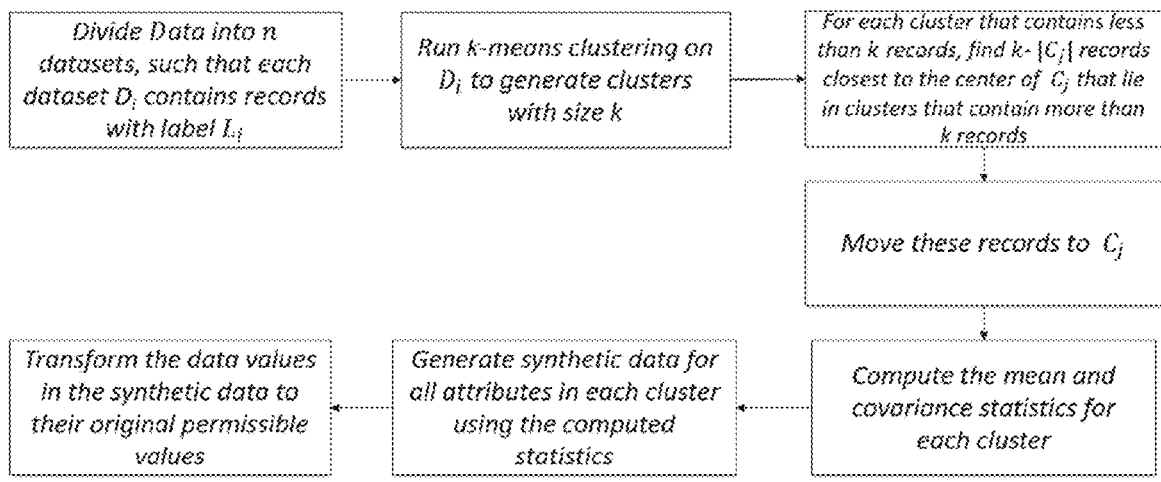
Fig. 4. Anonymization of non-IP features using an enhanced condensation approach

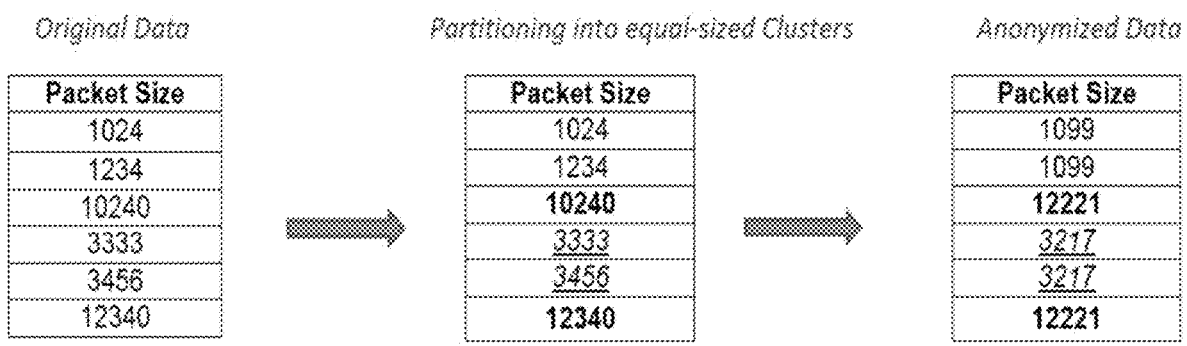
Fig. 5. Cluster-based differential privacy anonymization example

Fig. 6 A scenario on Injection attack and its recovery

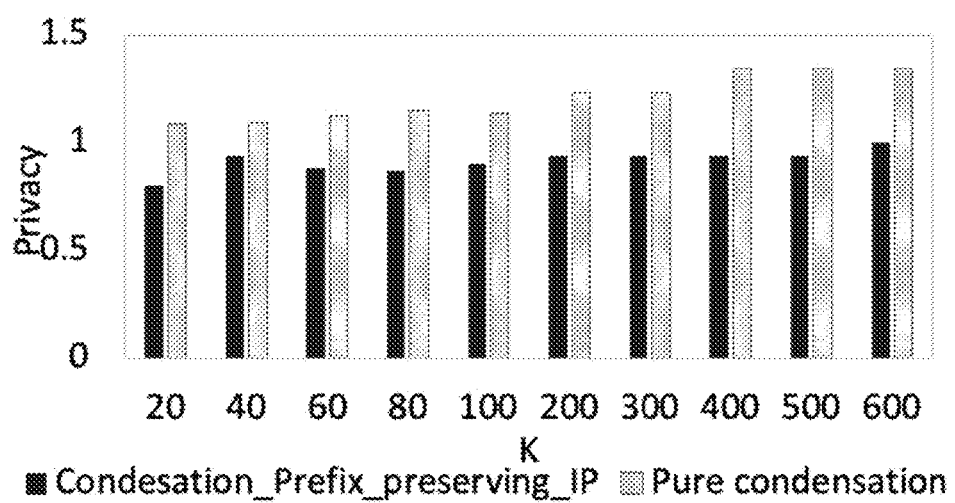
Fig. 7. Privacy results of condensation-based anonymization techniques using Dataset 1

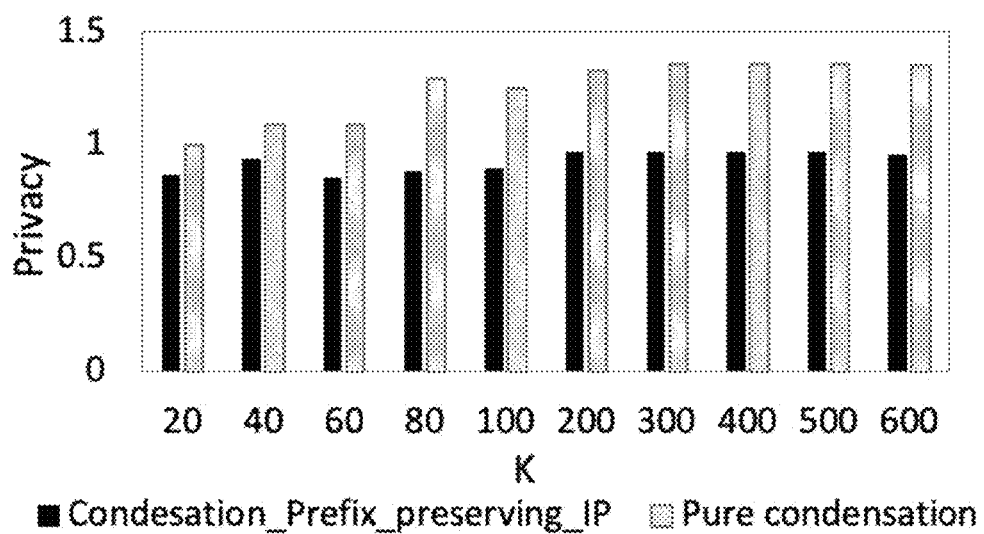
Fig. 8. Privacy results of condensation-based anonymization techniques using Dataset 2

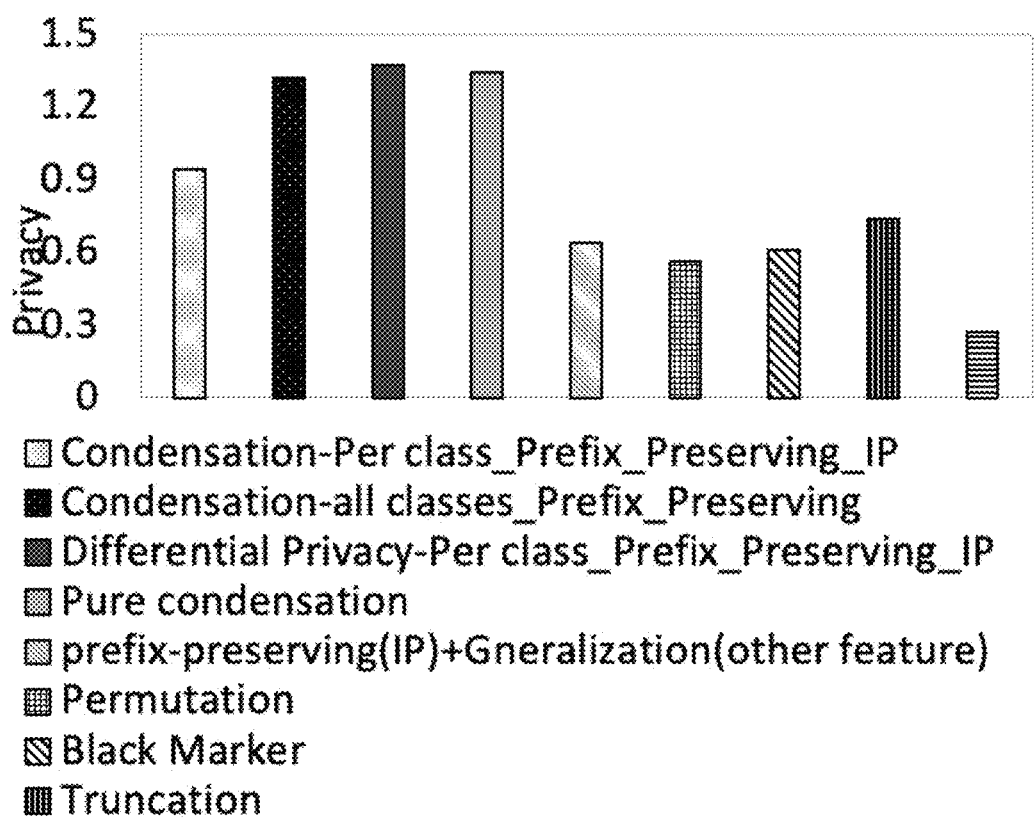
Fig. 9. Privacy results of different anonymization methods with Dataset 1

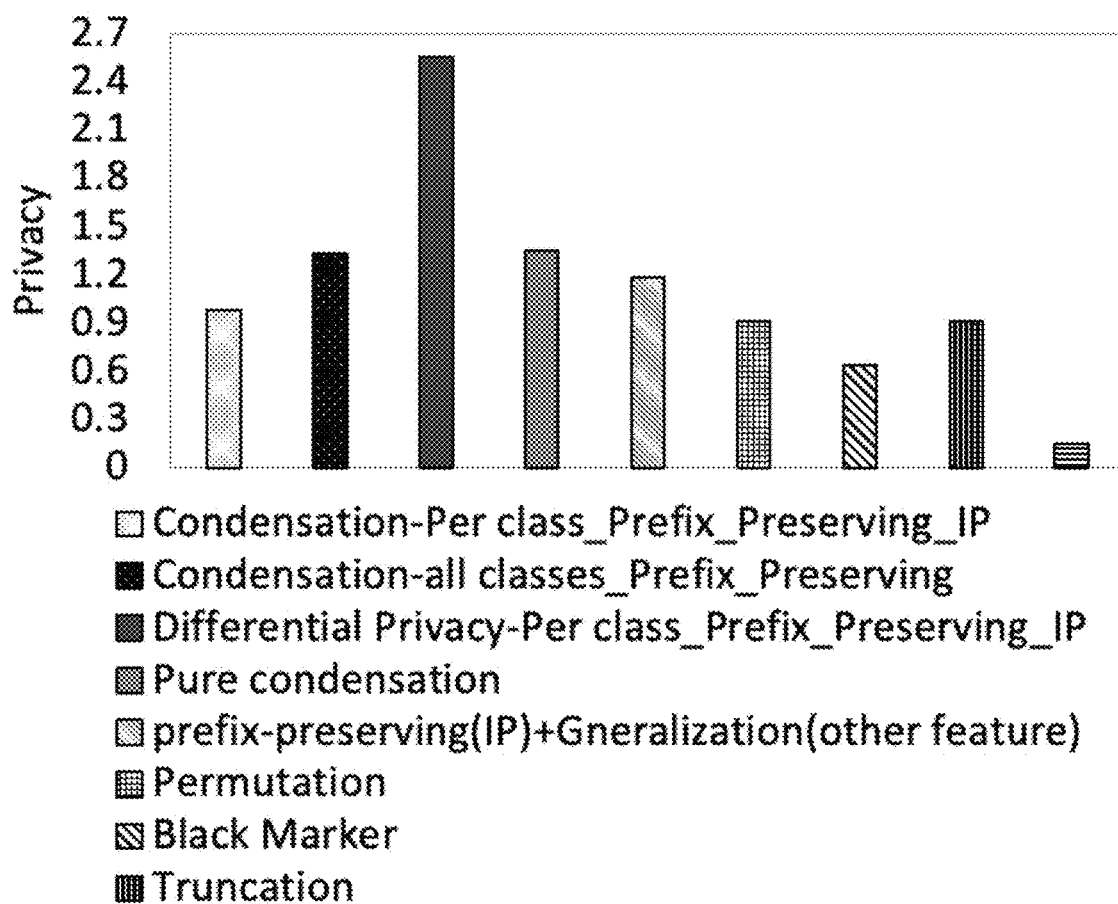
Figure 10. Privacy results of different anonymization methods with Dataset 2

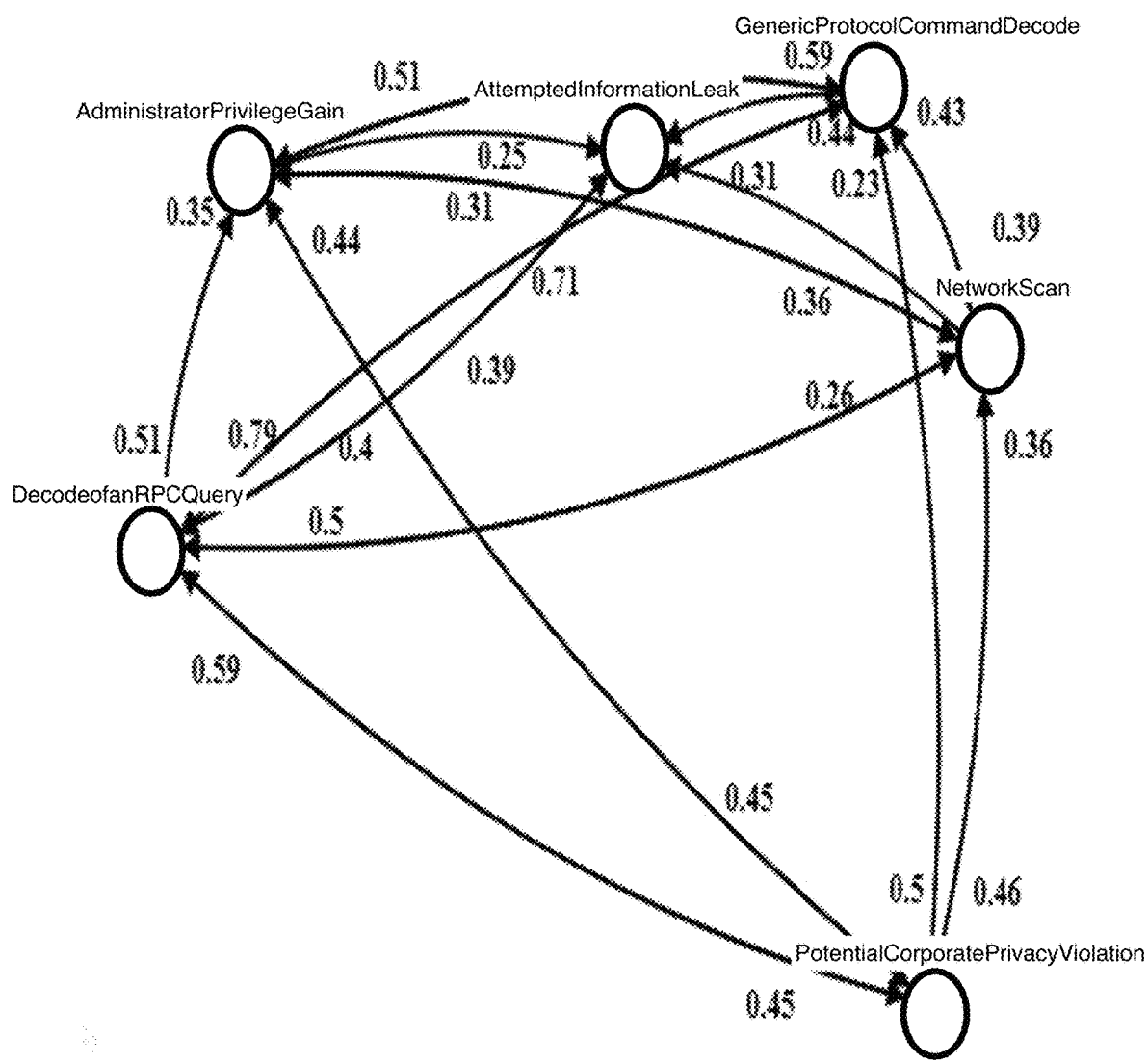
Fig. 11. SLN before Anonymization

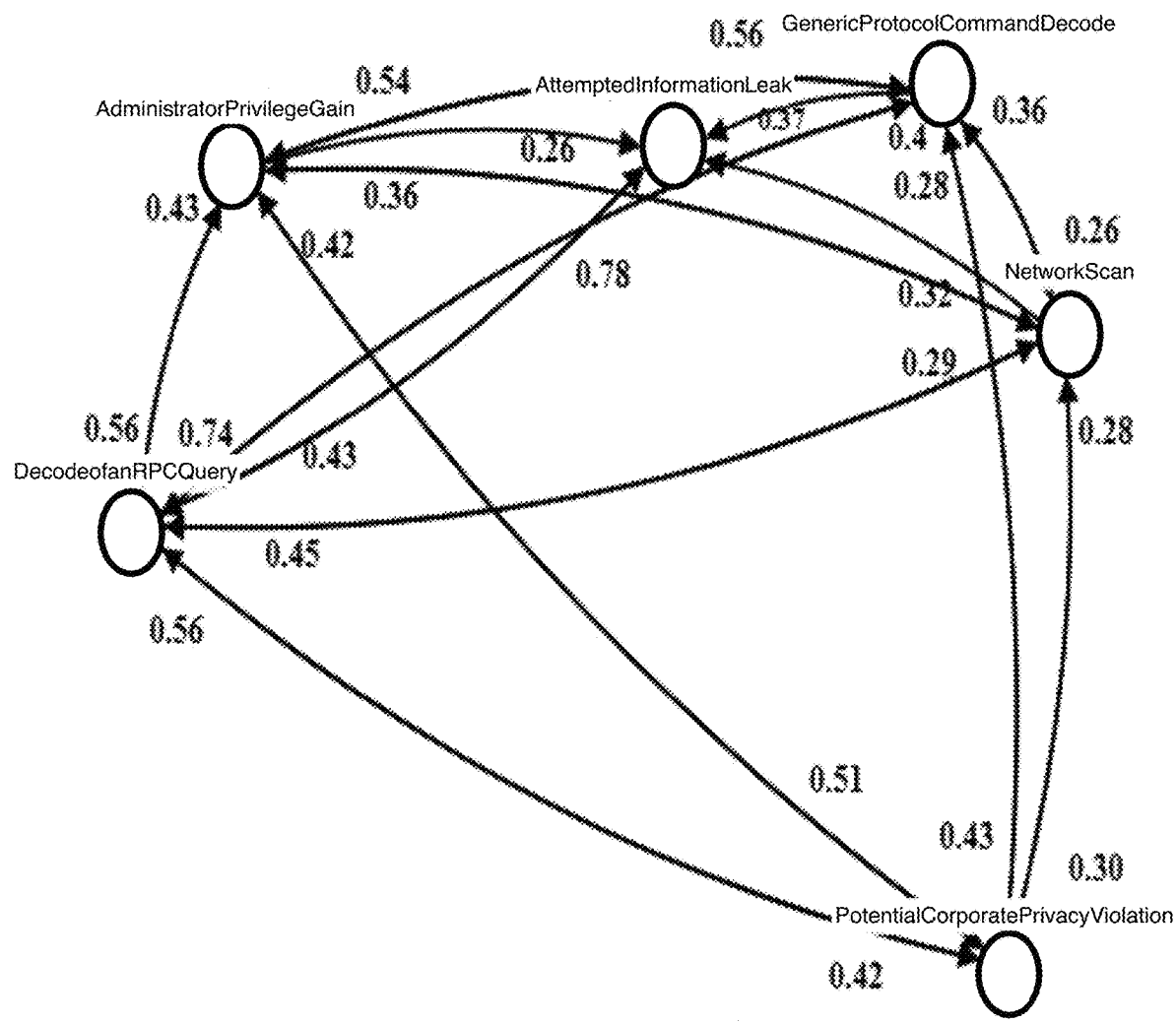
Fig. 12. SLN after Anonymization

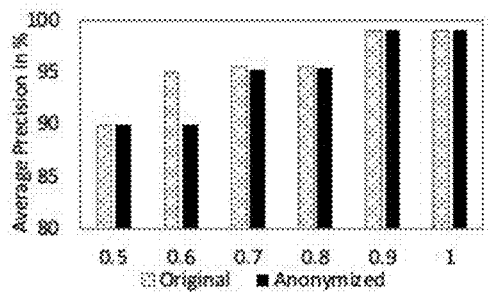
Fig. 13a. Precision values for SLNs- original vs. anonymized
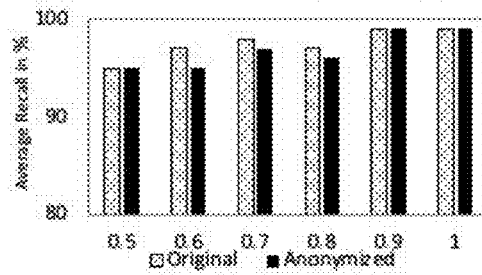
Fig. 13b. Recall values for SLNs- original vs. anonymized dataset1
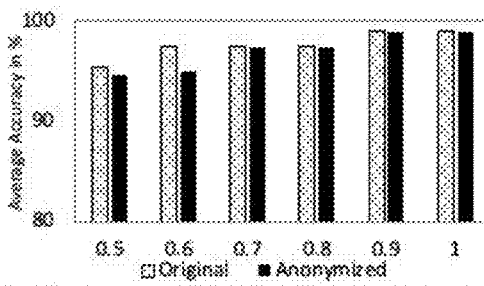
Fig. 13c. Accuracy values for SLNs- original vs. anonymized dataset1
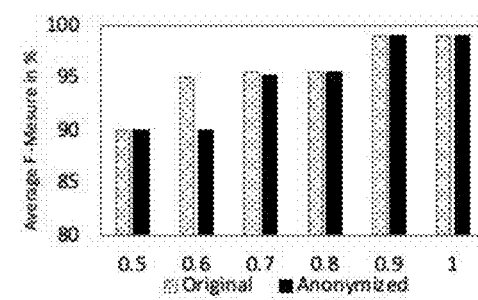
Fig. 13d. F-measure for SLNs- original vs. anonymized dataset1
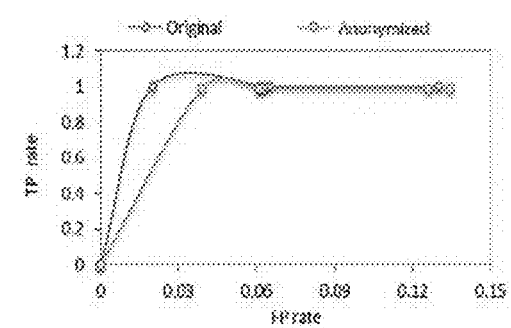
Fig. 13e. ROC curve for SLNs- original vs. anonymized dataset 1

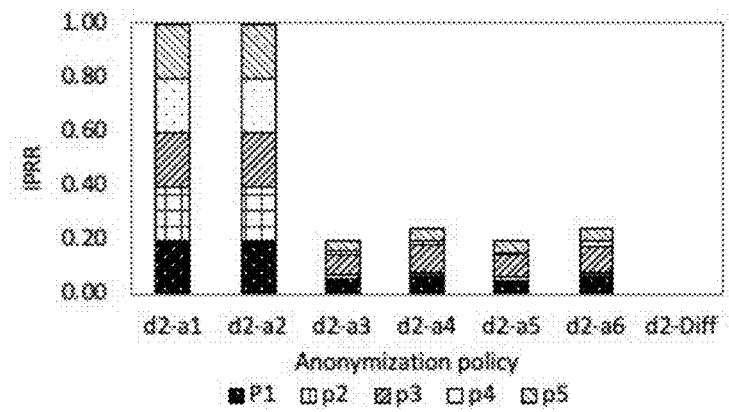
Fig. 14a. Testing data injection attacks using various anonymization policies on data set 1
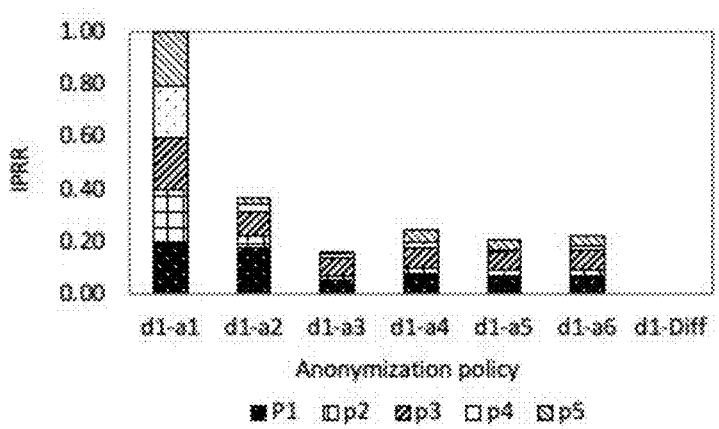
Fig. 14b. Testing data injection attacks using various anonymization policies on data set 2

US 11,483,294 B2

METHOD FOR ANONYMIZING NETWORK DATA USING DIFFERENTIAL PRIVACY

PRIOR FILED APPLICATIONS

This application claims priority benefit to U.S. Patent Application 62/892,726 entitled "A Method for Anonymizing Network Data Using Differential Privacy" filed Aug. 28, 2019, the contents of which are incorporated herein in their entirety.

STATEMENT REGARDING FEDERALLY SPONSORED R&D

The invention was made with U.S. Government support under Grant No. 11183 awarded by the MITRE-USM FFRDC. The U.S. Government has certain rights in the invention.

BACKGROUND

The embodiments described herein relate generally to network security, and particularly to the protection of network trace data.

Network security is one of the most significant issues for any organization, and network trace data is a primary asset that needs to be protected. It can be used in several tasks, such as network management, packet classification, traffic engineering, and tracking user behavior. However, these tasks are routinely performed by external organizations. Releasing network trace data to external entities is a very sensitive issue for any organization, and it is often prohibited because sharing such data exposes critical information of the organization, such as IP addresses, user IDs, passwords, host addresses, emails, personal web-pages, and even authentication keys.

Accordingly, a need exists for methods and systems for protecting sensitive network trace data.

BRIEF SUMMARY OF THE INVENTION

The embodiments described herein are directed to methods and systems for protecting network trace data.

Network traces are used for network management, packet classification, traffic engineering, tracking user behavior, identifying user behavior, analyzing network hierarchy, maintaining network security, and classifying packet flows.

In some embodiments, network trace data is protected by subjecting network trace data to data anonymization using an anonymization algorithm that simultaneously provides sufficient privacy to accommodate the organization need of the network trace data owner, provides acceptable data utility to accommodate management and/or network investigative needs, and provides efficient data analysis, at the same time.

In some embodiments described herein, the systems and methods provide a condensation-based differential privacy anonymization method that achieves an improved tradeoff between privacy and utility compared to existing techniques and produces anonymized network trace data that can be shared without lowering its utility value.

In some embodiments, the method does not incur extra computation overhead for the data analyzer. In some implementations, the systems and methods have shown that the invention preserves privacy and allows data analysis without revealing the original data even when injection attacks are launched against it. In some embodiments, the systems and methods are capable of providing identical intrusion detection rates for the anonymized datasets compared to original datasets of network trace data.

BRIEF DESCRIPTION OF THE DRAWINGS

FIG. 1 is an illustration of approach and overall system architecture.

FIG. 2 is an illustration of Packet aggregation to create flows.

FIG. 3 is an illustration of Anonymization of IP addresses.

FIG. 4 is an illustration of Anonymization of non-IP features using an enhanced condensation approach.

FIG. 5 is an illustration of Cluster-based differential privacy anonymization example.

FIG. 6 is an illustration of A scenario on Injection attack and its recovery.

FIG. 7 is an illustration of Privacy results of condensation-based anonymization techniques using Dataset 1.

FIG. 8 is an illustration of Privacy results of condensation-based anonymization techniques using Dataset 2.

FIG. 9 is an illustration of Privacy results of different anonymization methods with Dataset 1.

FIG. 10 is an illustration of Privacy results of different anonymization methods with Dataset 2.

FIG. 11 is an illustration of SLN before Anonymization.

FIG. 12 is an illustration of SLN after Anonymization.

FIG. 13*a*. Precision values for SLNs-original vs. anonymized.

FIG. 13*b*. Recall values for SLNs-original vs. anonymized dataset1.

FIG. 13*c*. Accuracy values for SLNs-original vs. anonymized dataset1.

FIG. 13*d*. F-measure for SLNs-original vs. anonymized dataset1.

FIG. 13*e*. ROC curve for SLNs-original vs. anonymized dataset1.

FIG. 14*a*. Testing data injection attacks using various anonymization policies on data set 1.

FIG. 14*b*. Testing data injection attacks using various anonymization policies on data set 2.

DETAILED DESCRIPTION

Disclosed Embodiments are Directed to

Any of the methods and systems described herein can provide wherein

Definitions

The terminology used herein is for the purpose of describing particular embodiments only and is not intended to limit the full scope of the claims. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention.

As used herein, the singular forms "a", "an" and "the" are intended to include the plural forms as well, unless the context clearly indicates otherwise. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," etc.). Similarly, the terms "comprises" and/or "comprising," when used in this specification, specify the presence of stated features, integers (or fractions thereof), steps, operations, elements, and/or components, but do not preclude the presence or addition of one or more other features, integers (or fractions thereof), steps, operations, elements, components, and/or groups thereof. As used in this document, the term "comprising" means "including, but not limited to."

As used herein the term "and/or" includes any and all combinations of one or more of the associated listed items. It should be understood that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All ranges disclosed herein also encompass any and all possible subranges and combinations of subranges thereof unless expressly stated otherwise. Any listed range should be recognized as sufficiently describing and enabling the same range being broken down into at least equal subparts unless expressly stated otherwise. As will be understood by one skilled in the art, a range includes each individual member.

Definitions

Anonymization is a process of excluding sensitive identifiers from a dataset but keeping its statistical characteristics so that it can be still useful for analysis and scientific research by external entities [20]. A network trace is the flow of packets between a sender and a receiver. It contains attributes such as source and destination addresses, source and destination port numbers, MAC address, timestamp, packet length, protocol, payload, etc. Adversaries may use some of these attributes to either identify end points (e.g. addresses), reveal user behavior (e.g. payload), or inject certain information (e.g. timestamp) that can be easily tracked.

Anonymization algorithms vary based on the level of anonymization performed on the data, and the type of features sanitized. For instance, enumeration can only be applied to numeric attributes in sequential order (e.g., IP address). Enumeration sorts the values of an attribute in ascending order and adds a value that is larger than the original one. This technique can be applied to all attributes [1].

A scheme may be proposed to anonymize network traces by shifting each value with a random offset, to replace the original value. A random permutation scheme can be used with timestamps. It is a one to one mapping process and is mostly applied to IP and MAC addresses.

Permutation requires two tables, one for maintaining the mapping from non-anonymized to anonymized IP addresses, and another to store anonymized IP addresses. Prefix preserving pseudonymization works in the same manner. It concentrates on satisfying the following rule: If the original IP address has a k bit prefix, the anonymized version must share the same prefix. Xu et al. in [7] released a trace dataset using a prefix preserving technique. Overall, prefix preservation has a greater utility than that of Black Marker anonymization scheme, since the latter replaces IP values with constants in a way that significantly degrades the statistical characteristics of a network trace [1, 21, 22]. It has the same effect as simply printing the log and blacking-out all IP addresses. This method loses all IP address information and is completely irreversible. While this method is simple, it is quite undesirable because it does not allow correlation of events perpetrated against a single host. Sequential numbering could be used by adding sequence numbers to distinguish the attribute values according to the order, but it requires large storage to maintain consistency of data.

Hashing addresses this limitation by using a cryptographic hashing function. In general, the generated hash value is smaller than the original attribute value, so this may facilitate dictionary attacks, which can be avoided by combining the hash function with a secret key using Hash Message Authentication Codes (HMAC) algorithm. These methods for anonymizing URLs and filenames. The sequence numbering works faster and results in shorter trace than keyed hashing, except that it can be executed on a single system compared to keyed hashing which is proven and used in distributed systems. Partitioning creates equivalence relations and canonical examples for a set of values, and then assigns an anonymized value whose range is within the corresponding partition. Truncation anonymizes the IP and the MAC addresses by deleting the least and keeping the most significant bits. This technique can make an end-point non identifiable [23]. For string attributes constant substitution can be used. The original data is replaced by a constant to add confidentiality to sensitive attributes [22]. Applying it to the identity attributes results in an undistinguishable data. Shuffling re-arranges pieces of data (e.g. within an attribute). Generalization approaches replace a data value by a more general data value [21]. In the k-anonymity model, the attributes are divided into sensitive, non-sensitive and quasi identifier attributes. Several equivalence classes are created by hiding the values of quasi identifiers, such that the quasi identifier attributes of any record would be similar to at least k−1 quasi identifier attributes. The k-anonymity model has some limitations with regard to the diversity of sensitive attributes. Therefore the l-diversity model requires the equivalence classes to have at least 1 unique values for sensitive attributes [25]. Both k-anonymity and l-diversity show good privacy protection on categorical attributes, but they lead to information loss when numerical attributes are anonymized. Micro aggregation techniques are comparable to k-anonymity techniques as they work mainly on numerical attributes. The records are clustered such that each cluster includes at least k records. However, the features are replaced with values that represent information about the cluster itself [26]. Micro-aggregation techniques cluster the records in the dataset so that the similarity among data points inside a cluster is minimized, while the similarity among data points in different clusters is maximized. The quasi identifier values are masked in a way that is relevant to the cluster itself, e.g., they can be replaced with the cluster average. Data generalization approaches are applied to network traces by 'partitioning' information (also called 'grouping' or 'binning'), e.g., grouping TCP/UDP port numbers by assigning a fixed value to each group [11].

A multi-view solution to address the problem of injection attacks may be proposed. This solution is based on the following basic method: after an initial application of prefix-preserving encryption on IP addresses, the data owner divides data into partitions and generates a size d (d as number of partitions) vector V of randomly generated integers in the range of 1 to N. A random number c is multiplied to V to get a vector V'. Data owner then applies prefix-preserving encryption techniques −V' of times on each partition. Here negative sign means prefix-preserving encryption is applied in a reverse fashion. The data owner sends this anonymized data set along with boundary of partitions as well as vector V to data analyzer. Since the random number c is withheld from data analyzer, data analyzer cannot recover original IP addresses. However data analyzer can applies prefix-preserving encryption V, 2V, . . . NV number of times on each partition. It is clear that one of this view (when $\alpha$V) is applied recovers original anonymized data (before applying V' encryptions). Data analyzer then analyzes all N versions of anonymized data and data owner can obliviously retrieve the correct version of results. The basic method is then extended to provide more protection, however still N views will be generated and the data analyzer has to spend N times more effort to analyze data. Given that network trace data is often quite large, and N is also quite large (from 20 to 160 in the paper), this method is often impractical.

A modified condensation based anonymization algorithm for network trace data may be proposed [27]. This algorithm optimizes the tradeoff between privacy protection and utility preservation, and it achieves much better privacy protection and utility preservation than existing anonymization techniques. There have been some research on anonymizing system logs [28, 29]. However, there are shortcomings in anonymizing logs similar to traces: 1) they only remove identifying information such as IP addresses or user names but are still vulnerable to injection attacks based on other attributes or add significant computational burden to data analyzer; 2) they do not optimize the tradeoff between privacy protection and utility preservation.

B. Requirements for Anonymization and Existing Tools

Anonymization tools should satisfy a few requirements to maintain the value of traces. The first is pseudonym consistency requirement which means that it is necessary to maintain consistency among anonymization for each distinct IP address or hardware addresses within a trace or between different traces that belong to the same organization. The second requirement is to perform a systematic sanitization of the transport, network, and data link layer header information in a trace, while, eliminating payload.

Different tools provide different trade-offs between privacy and information loss. Few tools work only on network layer information, while others work on cross layer packet anonymization [22]. Tcpdpriv removes private information from network traces using a prefix preserving anonymization technique [30]. Xu et al. [7] improved tcpdpriv by using a cryptography-based prefix preserving anonymization technique. Cryptopan can be used with parallel and distributed processing of traces [31]. It also meets the pseudonym consistency requirement. Fan et al. [32] evaluated the tool and found that attacks are still possible based on trace type. Slagell et al. in [13] suggested an improved version of Cryptopan that performs prefix-preserving IP address pseudonymization. Slagell also proposed FLAIM [21], a tool that is not tied to the specific log being anonymized and supports multi-level anonymization. Gamer et al. introduced Pktanon [33], a tool that achieves flexibility, extensibility and privacy; it allows arbitrary anonymization for every protocol field, and uses a defensive transformation technique to prevent privacy violations. Ipsumdump is a tool that translates tcpdump files into ASCII format to be easily readable by programs. It relies on prefix preserving pseudonymization techniques [34]. Koukis et al. developed an Anonymization Application Programming Interface (AAPI) tool, so users can write their own anonymization function and choose the appropriate policy for each attribute [15]. Foukarakis et al. [35] developed ANONTOOL based on AAPI, a command line tool that can generate synthetic data for both online and offline traces.

However, all these tools are still vulnerable to injection attacks on anonymized data which will be described in next section.

C. Attacks on Anonymized Data

Several attacks are initiated on anonymized data to reveal or infer sensitive sanitized information, such as identifying network topology [36], or discovering user behaviour [9, 15, 37].

In general, there are two types of attacks: inspection attacks and injection attacks. In inspection attacks the attacker is not authorized and only has information from trace and observation, while in injection attack the attacker is authorized and has knowledge about the injected pattern that no one else has [6]. In injection attacks, the attacker injects specific data into traffic. When the dataset is anonymized and released to the public, the attacker's goal is to identify the injected pattern and therefore, easily discover the binding between the original and anonymized data. For example, an attacker may inject a sequence of packets with certain patterns (e.g., specific source or destination port numbers, specific delay between packets, or specific packet sizes. The attacker may recognize these patterns in the anonymized data and through reverse engineering may uncover original data. Gattani in [8] showed that injection attacks are only possible when sufficient knowledge is available on when, how and where the trace is collected. So the best countermeasure against this attack is to keep such information private [7]. On the other hand, Eliminating the data generated by scanners that probe active hosts prior to anonymization, may provide a good approach to protect against active attacks. Injection attacks are performed either by injecting complex patterns within short time or injecting simple patterns over long time periods. Experiments that injected five different types of patterns with different complexity and concluded that it is difficult to protect data from injection attacks using traditional anonymization approaches. This approach can be empirically demonstrated the effectiveness of this attack against prefix-preserving anonymization and suggested remedies that might limit its damaging capability. However, it is quite difficult to stop such an attack without continuous human investigation. They also found that anonymizing IP addresses by assigning unique and static values to IP address via pseudonymization does not guarantee adequate privacy and immunity against packet injection attacks.

In structure recognition attacks, the objective is to exploit the structure among objects to infer their identities. For example, traces of Internet traffic will often include sequential address scans made by attackers probing for vulnerable hosts [38]. There are attacks that aim to recover IP addresses anonymized using prefix preserving anonymization techniques [38]. Those attacks exploit shared-text matching for cascading effects, with the shared text being the prefix.

Next, we describe our novel approach that generates an anonymization model with strong privacy protection. In particular, we adapt an improved version of the K-anonymity [24] that incorporates a differential privacy approach in it.

III. Approach

Most existing anonymization techniques only encrypt the IP addresses in the data set, but they are vulnerable to injection attacks, where a large fraction of injected packet patterns can be recovered even after permutation of IP addresses, bucketization of ports, adding random noise to time, to number of packets, and to packet size.

FIG. 1 depicts our system architecture and flow of information. Network data is collected from network data sources. Adversaries may have injected certain traffic patterns as well. Our anonymization algorithms will be applied to anonymize the collected data set and send the anonymized data to data recipients. We evaluate our approach based on privacy, utility (measured as accuracy of attack detection), and whether injected patterns can be recovered.

Next we describe the sensitive attributes we need to anonymize in Section A. Section B describes pre-processing steps to collect labeled network flow data. Section C presents our anonymization method for IP addresses. Section D reviews an existing anonymization method called condensation. Section E presents an enhanced condensation method to anonymize non IP features. This method supports K-anonymity. Section F proposes a condensation-based differential-privacy anonymization method. Section G describes how to test injection attacks and Section H discusses how to test our approach on sophisticated intrusion detection methods.

A. Sensitive Attributes

Data features in network data sources, when shared, may reveal the network architecture, user identity, and user information; therefore, it is essential to identify sensitive information. Based on our review, we identified several sensitive attributes that need to be protected.

IP addresses: They are considered one of the most important attributes to be anonymized. An attacker relies mainly on discovering the mapping of IP addresses to detect the host and network. For example, a source IP address indicates a user's IP, which may reveal the user identity. The destination IP address may be used by attackers to launch attacks. In addition, IP addresses may be used in intrusion detection algorithms as well. For example, if we know attacks often originate from specific IP addresses then we can be suspicious of possible attacks from these IP addresses. Similarly, if we know there have been attacks against a certain host (destination IP), then we can pay more attention to packets having that host as a destination IP. Thus we need to carefully balance the need for privacy protection and intrusion detection when anonymizing IP addresses.

Timestamps: They do not indicate any user information; however, they could be used in data injection attacks through discovering the mapping of information that is already known prior to anonymization. In addition, a time-stamp may denote specific action with respect to response delay and inter-flow time which could be matched with already known values.

Port Numbers: They partially characterize the applications that are used to create the trace and may be used in fingerprinting attacks to reveal that a certain application with suspected vulnerabilities is running on a network where the trace is collected from.

Trace Counters: They indicate the number of packets per flow. This attribute may be used for fingerprinting and injection attacks.

B. Labeled Network Flow Data

In this paper we focus on anonymizing network flows with header information. Each flow contains aggregated information from network packets that have common features, e.g. same source and destination IPs, same protocol etc. FIG. 2 shows an example of packets that are aggregated into four flows based on common features.

Packets that are close to each other in time and destined to same location are aggregated into a single flow.

Data about alerts raised by Intrusion Detection Systems (IDSs) are extracted and correlated with the corresponding flows. For example, if a flow contains information about packets associated with alerts, then the flow is automatically labeled as suspicious, otherwise it is labeled as normal (more details on this correlation approach is discussed in our previous work in [39]). The result of this process is a labeled dataset of network flows.

Anonymization of IP Addresses

The following two stages describe anonymization of IP addresses: (1) First, encrypt/permute the leading digits of the IP addresses (network number). Intrusion detection methods can still use the leading portion of the IP addresses. Attackers may discover the subnet but the next stage prevents identifying the host. (2) Then, for the remaining digits of the IP (host number part), we cluster these addresses, and randomize addresses in the same cluster (exact IP address cannot be located).

Algorithm 1 summarizes the steps needed to anonymize the IP address. The dataset D is divided into n datasets, such that D_i contains flows with label L_i where each label can be an attack or a benign activity. Then permute the leading digits of the IP addresses (network number) using a prefix preserving permutation function. The IP addresses are then clustered into k clusters based on their least significant digits (host number). The average for the least significant digits of IPs in the same cluster (host number) is calculated. Then the least significant digits of IPs (the last three digits) in each cluster are replaced using the computed average. FIG. 3 shows an example of IP anonymization into two clusters.

---

Algorithm 1: IP addresses Anonymization (D, k)

1. Divide dataset D into n datasets, such that $D_i$ contains records with label $L_i$
2. For i=0 to n do
    For j=1 to |IP| do
        Permute the leading digits of the
        IP addresses (network number)
        using prefix preserving
        permutation function
    End for
3. Cluster IP addresses into k clusters
    based on their least significant digits
    (host number)
4. Sort the clusters in ascending order of
    cluster size. Let them be $C_1, C_2, C_k$
5. For each cluster $C_j$ that contains less
    than k records,
    A. Find k- $|C_j|$ records closest to the
        center of $C_j$ that lies in clusters
        that contain more than k records
    B. Move these records to $C_j$
6. For each cluster $C_j$ do
    a. Compute the mean for the least
        significant digits of IPs in the
        same cluster (host number)
    b. Replace the least significant
        digits of IPs in each cluster using
        the computed statistics
    End for
End for

D. Data Anonymization Using Condensation

A heuristic condensation algorithm by Aggarwal and Yu, uses the statistical characteristics of the original data in order to generate synthetic data while preserving its statistical characteristics [40]. Other anonymization algorithms are limited to noise addition to the data, which may lead to insufficient privacy level.

The original condensation algorithm clusters records in the dataset such that the similarity among data points inside the clusters is minimized and the similarity among data points in different clusters is maximized. Each cluster contains at least k records, the quasi identifier values are masked in a way that is relevant to the cluster; for example, they can be replaced with the cluster averages.

E. Anonymizing Non-IP Features Using Modified Condensation

We utilize a condensation-based approach to perform anonymization on non-IP features. We apply two modifications to the original condensation algorithm.

First, we implement a per class condensation mechanism on network traces. The original condensation algorithm does not consider the differences between classes to perform the de-identification. In general, there is a significant difference between the behavior of network attackers and other users and such differences need to be captured in the anonymized data.

Second, the original condensation algorithm picks cluster centers randomly, which may lead to inferior clusters. Instead, we utilize k-means clustering algorithm which is relatively efficient in terms of within-class variance [2].

FIG. 4 shows the steps to anonymize non-IP features. The clusters are sorted in ascending order of cluster size. For each cluster $C\_j$ that contains less than k records, $k-C\_j$ records are selected if they are the closest to the center of $C\_i$ that lies in clusters that contain more than k records. The selected records are then moved to $C\_j$. For each cluster $C\_j$ the data is shifted into a new space using PCA. In the new space $Z\_1, Z\_2, Z\_p$ are independent components. Then, a random data $Z\_i^{\wedge}$ with similar statistical features of $[\![Z]\!]\_i$ is generated. $Z\_1^{\wedge}, Z\_2^{\wedge}, Z\_3^{\wedge}$ are combined into one dataset. Finally, $Z^{\wedge}$ is shifted back to the original data space using reverse PCA.

Condensation-Based Differential-Privacy Anonymization Method

The differential privacy methods introduced by Dwork [18] provide stronger privacy protection than K-anonymity. To protect the sensitive information, differential privacy methods systematically add a random number generated from a special distribution centered at zero to the results of all data queries. Differential privacy mechanisms ensure that the addition or removal of single database record, has no significant effect on the outcome of any analysis performed on the database. The idea of preserving the privacy of network traffic using a noisy version of the true answer is not new, however, the way of noise addition is different in the case of differential privacy.

Our differential privacy approach works as follows. First, we implement a prefix-preserving technique to anonymize IP addresses. We permute the n leading digits (network part). For the remaining digits cluster these addresses into K clusters (host part). Then we randomize addresses within the same cluster. Second, we implement a per class differential privacy mechanism. Third, we utilize the differential privacy in our condensation method. Our method clusters records based on the features of network trace data. Now each cluster has packets or flows with similar features. We then compute the mean of these features and add Laplace noise to the mean. The perturbed mean replaces the original values. FIG. 5 illustrates our cluster-based differential privacy anonymization method. At first we partition data into three clusters which are displayed by different font type in the table. Then we compute the mean of each cluster and add Laplace noise to the mean. The final step is to replace every original value with this perturbed mean.

---

Algorithm 2: Differential Private-Condensation of network data (Dataset D, k)

---

1. Divide D into n datasets, such that $D_i$ contains records with label $L_i$
   Let $n_i$ be the size of $D_i$
2. For i=0 to n do
   a. Run k-means clustering on $D_i$ to generate $[n_i/k]$
   b. Sort the clusters in ascending order of cluster size. Let them be $C_1, C_2,...,C_k$
   c. For each cluster $C_j$ that contains less than k records, find k- $|C_j|$ records closest to the center of $C_j$ that lies in clusters that contain more than k records
   d. Move these records to $C_j$
   e. For each cluster $C_j$
      1. Synthetic Data generation: compute the mean of each features and corresponding Laplace noise.
      2. Replace the data values with the perturbed mean.
      End for
   End for

---

The added noise follows Laplace distribution with mean zero and standard deviation=sensitivity /, where sensitivity= (max value in cluster−min value in cluster)/cluster size.

Epsilon is a small constant (usually around 0.01). According to the definition we can see that the larger the cluster size, the smaller the noise, so this method works better for large volumes of data. Algorithm 2 shows the steps to achieve differential privacy on all features except IP addresses, which are anonymized based on an IP prefix-preserving method. First the dataset is divided into subsets and each subset contains instances with an identical class label. Then we utilize K-means clustering method to generate clusters per subset. Since we may end up with some clusters having fewer than k-points and some may have more. Some points are moved from large clusters to small clusters. Then we compute mean of these features and adds Laplace noise to the mean. The perturbed mean will replace the original values.

Testing Injection Attacks on Data Anonymized by Our Algorithms

Figure 6:
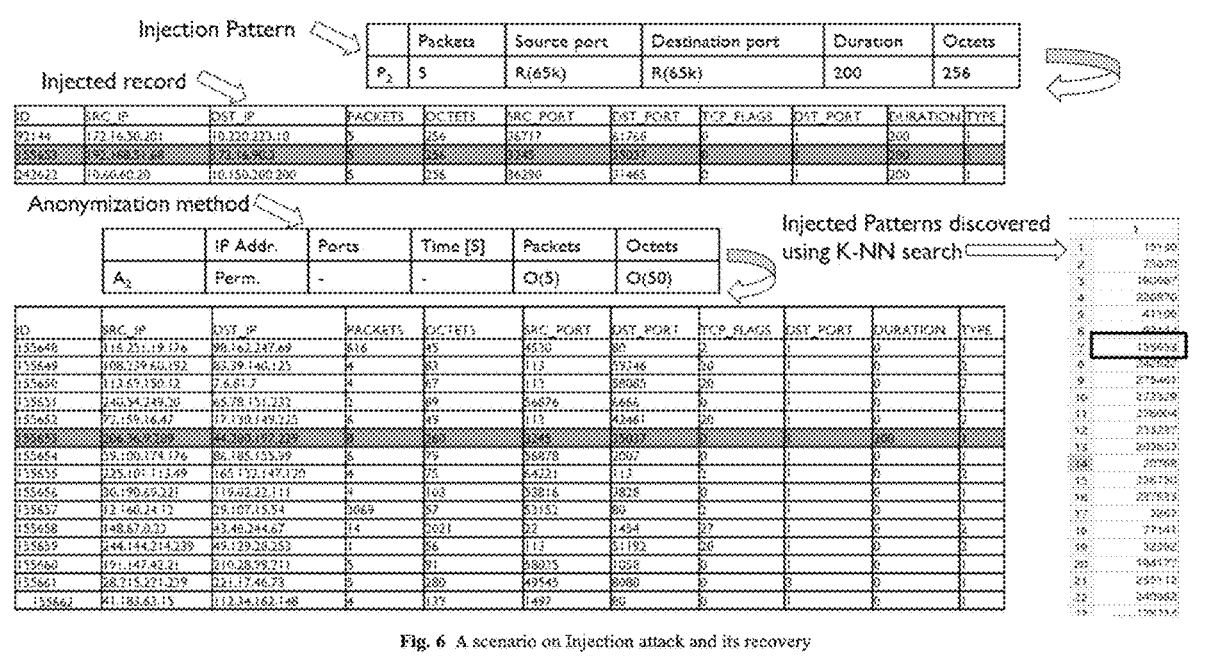

We want to investigate whether datasets that have been anonymized with differential privacy and other approaches are robust enough to withstand injection attacks. Table 1 shows some example patterns used to prepare the injected data. We inject similar patterns and they are injected in the data before anonymization. The data is anonymized using several permutation-based anonymization policies including our proposed differential privacy method. Table 2 shows the anonymization approaches listed in [6]. We then try to identify the injected patterns. We use K-NN Search to recover the injected patterns from the anonymized data. Formally, $knnsearch(p\_i, A\_i) \forall p\_i$ finds the nearest neighbor in the anonymized data $A\_i$ for each record that represents the pattern $p\_i$. The result of K-NN search is a column vector where each record contains the index of nearest neighbor in the anonymized flows for the corresponding record in the injected flows. If there is a match between the injected pattern and the nearest neighbor, the attack is considered successful. The number of recovered patterns using each anonymization policy is reported. An example on an injection attack, and how it is recovered is shown in FIG. 6.

TABLE 1

Patterns injected in the trace data

|  | Packets | Source port | Destination port | Duration | Octets |
|---|---|---|---|---|---|
| $P_1$ | 1 | Fixed | 80 | — | 160 |
| $P_2$ | 5 | R(65k) | R(65k) | 200 | 256 |
| $P_3$ | 110 | Fixed | 80 | 200 | 480[+32] |
| $P_4$ | 10 | R(65k) | R(65k) | 200 | 832[+32] |
| $P_5$ | 50 | R(65k) | R(65k) | 150 + R(300) | 1208[+R(8)] |

Values in square brackets denote the attribute evolution between flows
R(x): random number between 1 and x
Total number of injected flows is 650 (130) flows from each pattern

TABLE 2

Anonymization polices used for testing data injection attacks

|  | IP Addr. | Ports | Time [S] | Packets | Octets |
|---|---|---|---|---|---|
| $A_1$ | Permutation | — | — | — | — |
| $A_2$ | Permutation | — | — | O(5) | O(50) |
| $A_3$ | Permutation | B(8) | O(30) | — | — |
| $A_4$ | Permutation | B(2) | O(60) | — | — |
| $A_5$ | Permutation | B(8) | O(30) | O(5) | O(50) |
| $A_6$ | Permutation | B(2) | O(120) | O(10) | O(200) |

B(x): bucketized in x buckets,
O(x): Added a uniform random offset between −x and +x H. Sophisticated Intrusion Detection Methods An important question comes up with any anonymization method: How well do existing techniques work when they are applied on anonymized data versus the original data? In this section we provide an answer to this question by using intrusion detection methods applied on anonymized and original data. This simple classification based intrusion detection methods generate accurate results on anonymized data sets compared with original non-anonymized data sets. We now test our anonymization method on sophisticated intrusion detection methods such as those that rely on semantic networks [41]. Semantic networks are graphs with nodes representing attacks or benign activities and edges representing the semantic links between them, and they are called semantic linked networks (SLN). The stronger the relationship between nodes the higher the possibility they co-occur under a particular context. Consequently, observing one suspicious node can help proactively avoid another. We generate two types of SLNs, the first one was based on the original trace data, while the second one on the anonymized data. Logged labeled flows are anonymized, then classification techniques are applied on the anonymized flows. Then, the SLN generated from anonymized data is used to identify intrusions. We finally compare the SLN generated with anonymized data, against the SLN built over original data. More details applying SLNs for intrusion detection can be found in our previous work [41].

IV. Experiments and Evaluation

In this section, we present the results of the experiments that have been conducted to test the effectiveness of our anonymization approach. Two sets of experiments are described:

The first set of experiments evaluates our approach by measuring privacy and accuracy. Two different datasets are anonymized and privacy is measured on the resulting datasets. In addition, accuracy is measured before and after anonymization. Furthermore, we measure the robustness of the approach when the anonymized data is used in sophisticated intrusion detection techniques, versus when the original non-anonymized data was used to generate such techniques;

The second set of experiments measures the immunity of the proposed techniques against data injection attacks. We measure the recovery rate of several patterns that are injected in the datasets before anonymization.

Objectives of experiments: In the experimental evaluation we prove that our model:

Works reliably and is accurate enough while preserving privacy, when compared with other approaches;
Is immune against Data Injection Attacks;
Works very well when applied on sophisticated intrusion detection techniques.

A. Datasets

We chose two datasets to run our experiments:

PREDICT Repository: PREDICT (A Protected REpository for Defense of Infrastructure against Cyber Threats) has shared real-world datasets for cyber security research to advance the state-of-the-art network security research and development [42]. In our experiments we used packet captures from the 2013 National Collegiate Cyber Defense Competition (nccdc.org).

We created a software application to generate flows from packet captures and correlate the created flows with alerts generated by the Snort Intrusion Detection System [39, 43]. We generated a total of 400893 benign and suspicious flows to use in our experiments.

University of Twente Dataset: The second data set provided by Sperotto et al. was created at the University of Twente by monitoring a honeypot for HTTP, SSH and FTP traffic [44]. We selected 401732 suspicious flows from this dataset with the corresponding alerts.

Since the PREDICT dataset contains mostly normal flows and the Twente dataset mostly attack flows, we draw a random sample from each dataset and combine them to create two new mixed datasets. The combined datasets are:

Dataset 1: 70% PREDICT dataset+30% Twente dataset
Dataset 2: 50% PREDICT dataset+50% Twente dataset These two datasets are further partitioned into training (70%) and evaluation (30%) parts.

Evaluation Measures

Accuracy: we employ several accuracy measures to validate the effectiveness of our anonymization algorithms such as TP Rate, FP Rate, Precision, Recall, F-Measure, and ROC (Receiver Operating Characteristic) area.

Privacy: We use conditional privacy to measure the privacy of anonymized traffic data [45]. This measure depends on mutual information between the raw and anonymized records at a certain confidence level; while information loss is related to the amount of mismatch among the records before and after, conditional privacy is based on differential entropy of a random variable. The differential entropy of A given B=b is $$h(A|B) = \int_{\Omega_{A,B}} f_{A,B}(a,b) \log_2 f_{A|B=b}(a) da\, db \quad (1)$$

Where A is a random variable that describes the data, and B is a variable that gives information on A. 〚Ω〛_(A,B) identifies the domain of A and B. Therefore, the average conditional privacy of A given B is $$\Pi(A|B) = 2^{h(A|B)} \quad (2)$$

If D_i is the attribute value of the original data and D_i'^' is the value after anonymization. The conditional privacy for anonymizing that attribute is $2^{h(D_i|D_i')}$ where $h(D_i|D_i')$ is the conditional entropy of the original data given the anonymized data. Conditional privacy is calculated and averaged over all attributes.

C. Results

1) Privacy Results:

FIGS. 7 and 8 show the conditional privacy results for the anonymized datasets generated by the original condensation technique (described in section III-E) and our modified one (Algorithm 2). This experiment measures the effect of increasing the cluster size (k) on the values of conditional privacy when using generalization approaches such as condensation. We utilized the pure condensation but without preserving the Prefix of IP. Then, we utilized condensation, and we preserved the prefix of IP addresses.

Two main conclusions can be drawn from those figures. First, the values of conditional privacy get higher when we increase k. Pure condensation attains higher privacy values than condensation with prefix-preservation. Source and destination IP address have a significant contribution to the higher privacy values in the case of pure condensation. However, the prefixes of IP addresses are not preserved using pure condensation, which leads to more information loss and higher values of conditional privacy.

The second set of privacy experiments compares different anonymization techniques, including our differential privacy approach. FIG. 9 shows the privacy measures for the Dataset 1 using different techniques. Based on this measure our technique (Algorithm 2) performed better than most of existing techniques. We utilized three types of condensation approaches: First, we performed typical condensation but without preserving the prefix of IP. Then, we performed typical condensation, but we performed prefix preserving anonymization on IP addresses. Finally, we performed our perclass condensation method with IP prefix preserving and differential private-perclass condensation with IP prefix preservation. It is observed that pure condensation attains higher privacy values than prefix-preserving condensation. The perclass condensation method with differential privacy approach outperformed all other methods. The experiment results using Dataset 2 shown in FIG. 10, are similar but our approach reveals much higher levels of privacy compared to the other approaches.

2) Accuracy Results

We ran several experiments to measure and compare accuracy on anonymized vs. original data. We utilize K-Nearest Neighbors (KNN) classifier to run our experiments. Tables 3 and 4 show the KNN classification results on Dataset 1 and Dataset 2 respectively. In terms of accuracy, our approach when applied with prefix preserving approach to anonymize data (Condensation-per Class, differential private-Condensation-Per Class) achieves the highest accuracy compared to other techniques. It is evident that while some techniques such as Black Marker achieve acceptable privacy levels, they lead to high information loss as demonstrated by our privacy results. Therefore, the results when such approaches are used are low compared to other techniques. It is also noticed that there is a significant difference between approaches that belong to the same category. For instance, truncation attains higher accuracy compared to reverse-truncation. Reverse truncation sets the most significant bits to zero, therefore, the predictability of features is significantly affected after anonymization. The results clearly indicate the importance of prefix preserving approach to decrease the amount of information loss. Consequently, all approaches that apply our prefix preserving algorithm attain higher accuracy values. In addition, the prefix preserving differential privacy algorithm achieves the best results in terms of accuracy. Contrary to approaches such as Black Marker and Truncation, the results of the differential privacy algorithm are consistent across both datasets when comparing the results shown in Tables 3 and 4.

TABLE 3

Dataset 1 Experiment-KNN Classification on Anonymized and Original data

| | TP Rate | FP Rate | Precision | Recall | F-Measure | ROC Area | Class |
|---|---|---|---|---|---|---|---|
| Original | 0.98 | 0.013 | 0.981 | 0.98 | 0.98 | 0.984 | Attack |
| | 0.987 | 0.02 | 0.987 | 0.987 | 0.987 | 0.984 | Normal |
| | 0.984 | 0.017 | 0.984 | 0.984 | 0.984 | 0.984 | Avg |
| Condensation-Per | 0.941 | 0.059 | 0.961 | 0.941 | 0.951 | 0.941 | Attack |
| Class Prefix Preserving IP | 0.941 | 0.059 | 0.913 | 0.941 | 0.927 | 0.941 | Normal |
| | 0.941 | 0.059 | 0.942 | 0.941 | 0.941 | 0.941 | Avg |
| Condensation-All | 0.628 | 0.582 | 0.62 | 0.628 | 0.624 | 0.523 | Attack |
| Classes Prefix Preserving IP | 0.418 | 0.372 | 0.426 | 0.418 | 0.422 | 0.523 | Normal |
| | 0.545 | 0.498 | 0.543 | 0.545 | 0.544 | 0.523 | Avg |
| Differential Privacy-Per | 0.941 | 0.059 | 0.96 | 0.941 | 0.95 | 0.94 | Attack |
| Class Prefix Preserving IP | 0.941 | 0.059 | 0.913 | 0.941 | 0.927 | 0.94 | Normal |
| | 0.941 | 0.059 | 0.941 | 0.941 | 0.941 | 0.94 | Avg |
| Pure Condensation | 0.691 | 0.612 | 0.631 | 0.691 | 0.66 | 0.54 | Attack |
| | 0.388 | 0.309 | 0.454 | 0.388 | 0.418 | 0.54 | Normal |
| | 0.571 | 0.491 | 0.56 | 0.571 | 0.564 | 0.54 | Avg |
| Prefix-Preserving(IP) + | 1 | 1 | 0.602 | 1 | 0.752 | 0.5 | Attack |
| Generalization | 0 | 0 | 0 | 0 | 0 | 0.5 | Normal |
| (Other Features) | 0.602 | 0.602 | 0.362 | 0.602 | 0.452 | 0.5 | Avg |
| Permutation | 0.999 | 1 | 0.602 | 0.999 | 0.751 | 0.5 | Attack |
| | 0 | 0.001 | 0.048 | 0 | 0 | 0.5 | Normal |
| | 0.602 | 0.602 | 0.381 | 0.602 | 0.452 | 0.5 | Avg |
| Black Marker | 1 | 1 | 0.602 | 1 | 0.752 | 0.5 | Attack |
| | 0 | 0 | 0 | 0 | 0 | 0.5 | Normal |
| | 0.602 | 0.602 | 0.362 | 0.602 | 0.452 | 0.5 | Avg |
| Truncation | 0.578 | 0.506 | 0.633 | 0.578 | 0.604 | 0.577 | Attack |
| | 0.494 | 0.422 | 0.436 | 0.494 | 0.463 | 0.577 | Normal |
| | 0.544 | 0.473 | 0.555 | 0.544 | 0.548 | 0.577 | Avg |

TABLE 3-continued

Dataset 1 Experiment-KNN Classification on Anonymized and Original data

|  | TP Rate | FP Rate | Precision | Recall | F-Measure | ROC Area | Class |
|---|---|---|---|---|---|---|---|
| Reverse Truncation | 0.082 | 0.163 | 0.432 | 0.082 | 0.137 | 0.46 | Attack |
|  | 0.837 | 0.918 | 0.376 | 0.837 | 0.519 | 0.46 | Normal |
|  | 0.382 | 0.463 | 0.41 | 0.382 | 0.289 | 0.46 | Avg |

TABLE 4

Dataset 2 Experiment-KNN Classification on Anonymized and Original Data

|  | TP Rate | FP Rate | Precision | Recall | F-Measure | ROC Area | Class |
|---|---|---|---|---|---|---|---|
| Original | 0.991 | 0.013 | 0.991 | 0.991 | 0.991 | 0.989 | Attack |
|  | 0.987 | 0.009 | 0.987 | 0.987 | 0.987 | 0.989 | Normal |
|  | 0.984 | 0.011 | 0.989 | 0.989 | 0.989 | 0.989 | Avg |
| Condensation-Per | 0.954 | 0.118 | 0.917 | 0.954 | 0.935 | 0.918 | Attack |
| Class Prefix Preserving IP | 0.882 | 0.046 | 0.934 | 0.882 | 0.907 | 0.918 | Normal |
|  | 0.924 | 0.088 | 0.924 | 0.924 | 0.923 | 0.918 | Avg |
| Condensation-All | 0.553 | 0.562 | 0.575 | 0.553 | 0.564 | 0.495 | Attack |
| Classes Prefix Preserving IP | 0.438 | 0.447 | 0.416 | 0.438 | 0.427 | 0.495 | Normal |
|  | 0.504 | 0.514 | 0.508 | 0.504 | 0.506 | 0.495 | Avg |
| Differential Privacy-Per | 0.975 | 0.125 | 0.915 | 0.975 | 0.944 | 0.945 | Attack |
| Class Prefix Preserving IP | 0.875 | 0.025 | 0.962 | 0.875 | 0.916 | 0.945 | Normal |
|  | 0.933 | 0.083 | 0.935 | 0.933 | 0.932 | 0.945 | Avg |
| Pure condensation | 0.662 | 0.597 | 0.603 | 0.662 | 0.631 | 0.532 | Attack |
|  | 0.403 | 0.338 | 0.464 | 0.403 | 0.431 | 0.532 | Normal |
|  | 0.553 | 0.488 | 0.545 | 0.553 | 0.547 | 0.532 | Avg |
| Prefix-Preserving(IP) + | 1 | 1 | 0.579 | 1 | 0.733 | 0.67 | Attack |
| Generalization | 0 | 0 | 0 | 0 | 0 | 0.67 | Normal |
| (Other Features) | 0.579 | 0.579 | 0.335 | 0.579 | 0.424 | 0.67 | Avg |
| Permutation | 0.083 | 0.31 | 0.27 | 0.083 | 0.127 | 0.387 | Attack |
|  | 0.69 | 0.917 | 0.354 | 0.69 | 0.468 | 0.387 | Normal |
|  | 0.339 | 0.566 | 0.305 | 0.339 | 0.271 | 0.387 | Avg |
| Black Marker | 0 | 0 | 0 | 0 | 0 | 0.5 | Attack |
|  | 1 | 1 | 0.421 | 1 | 0.593 | 0.5 | Normal |
|  | 0.421 | 0.421 | 0.178 | 0.421 | 0.25 | 0.5 | Avg |
| Truncation | 0.499 | 0.396 | 0.634 | 0.499 | 0.559 | 0.595 | Attack |
|  | 0.604 | 0.501 | 0.468 | 0.604 | 0.527 | 0.595 | Normal |
|  | 0.544 | 0.44 | 0.564 | 0.544 | 0.546 | 0.595 | Avg |
| Reverse Truncation | 0.906 | 0.9 | 0.58 | 0.906 | 0.708 | 0.503 | Attack |
|  | 0.1 | 0.094 | 0.437 | 0.1 | 0.163 | 0.503 | Normal |
|  | 0.567 | 0.56 | 0.52 | 0.567 | 0.478 | 0.503 | Avg |

3) Results on Sophisticated Intrusion Detection Techniques

In this set of experiments we evaluate the two types of SLNs created using the original and the anonymized datasets. Different Intrusion detection evaluation metrics are used to measure the success rate of identifying attacks using SLNs when applied on top of K-NN classification techniques.

The two types of initial SLNs created before and after anonymization are shown on FIGS. 11 and 12. The two SLNs have the exact same structure. In addition, the strengths of relationships between attacks (values on the graph edges) are very close on the SLNs before and after anonymization. When SLNs are used for attack detection purposes, typically they increase recall values. We experimented with SLNs using different values of a threshold t which specifies the minimum cutoff value to include relevant nodes to the starting one initially predicted by the K-NN classifier. We compare the accuracy of identifying attacks using SLNs on anonymized and original datasets in terms of Precision, Recall, F-measure and Receiver Operating Characteristic (ROC). The ROC is a popular measure that has been used to compare intrusion detection techniques and plot TP and FP rates associated with various operating points when different intrusion detection techniques are used. The values of TP and FP rates (TPR and FPR) are calculated as:

$$TPR = \frac{TP}{TP + FN} \qquad (3)$$

$$FPR = \frac{FP}{FP + TN} \qquad (4)$$

The results of this experiment are shown on FIGS. 13*a*-13*e*. The results of the experiments on Dataset1 show that there are no significant differences of Precision, Recall, and F-measure values before and after anonymization. The ROC curve for each dataset are shown on FIG. 13*e* clearly close and the differences between original and anonymized datasets are very small in terms of TPR and FPR. Results on the second dataset are very similar to the first dataset, so they are omitted.

4) Results on Injection Attacks

We simulate injection attacks by adding records with specific patterns to the original datasets. Then we run the anonymization algorithms on the two datasets and try to identify the injected records. We then compare the Injected Pattern Recovery Rate (IPRR) on various anonymization policies using the following formula:

$$IPRR = \frac{\text{Recovered injected pattern}}{\text{Total number of injected patterns}} \quad (5)$$

We applied five anonymization policies (A_1-A_5) in addition to our differential privacy approach on both datasets. Those policies are described in table 1. In addition, the five patterns described in section III-F are injected in both datasets. Patterns 1, 2 and 3 are simpler than patterns 4 and 5. Each pattern consists of 130 records, with a total of 650 injection attempts. Those patterns work as a fingerprint in the original data to be discovered later after anonymization. The objective of this process is to discover the immunity of the anonymization algorithms against injection attacks [6]. The results of this experiment on both datasets are shown on FIGS. 14a and 14b. It is clear that permutation-based anonymization policies lead to the highest recovery ratio compared to other approaches; KNN search discovers the majority of records for patterns 1 and 3. As the complexity of the permutation function used in the anonymization policy increases, IPRR values decreases. However, KNN search still discovers a significant percentage of the injected patterns. Compared to these anonymization policies, when our differential privacy-based anonymization policy is used, zero records are recovered, testifying to the robustness of our approach against injection attacks.

V. Conclusion and Future Work

Embodiments herein provide a method that utilizes differential privacy to anonymize network traces and it has the following characteristics: It has a very strong privacy guarantee; it is robust when used in generating attack prediction models even when sophisticated intrusion detection techniques such as graph-based approaches are used; it does not add any burden to data analyser. Data analyser can analyse data as it is. Our experiments show that using differential privacy for anonymization produces superior results compared to existing techniques in terms of privacy-utility trade-off.

The embodiments herein, and/or the various features or advantageous details thereof, are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein. Rather, these embodiments are provided so that this disclosure will be thorough and complete, and will fully convey the scope of the inventive concepts to those skilled in the art. Like numbers refer to like elements throughout.

In a preferred embodiment, the system may be described using functional block diagrams to describe a machine in the example form of computer system, within which a set of instructions for causing the machine to perform any one or more of the methodologies, processes or functions discussed herein may be executed. In some examples, the machine is a plurality of devices in communication with a Server as described above. The machine operates as both a server or a client machine in a client-server network environment when each device is connected to the Server in the cloud. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein.

Example computer systems may include processor, memory, data storage and communication interface, which may communicate with each other via data and control bus. In some examples, the computer system also includes a display and/or user interface.

Processor may include, without being limited to, a microprocessor, a central processing unit, an application specific integrated circuit (ASIC), a field programmable gate array (FPGA), a digital signal processor (DSP) and/or a network processor. Processor may be configured to execute processing logic for performing the operations described herein. In general, processor may include any suitable special-purpose processing device specially programmed with processing logic to perform the operations described herein.

Memory may include, for example, without being limited to, at least one of a read-only memory (ROM), a random access memory (RAM), a flash memory, a dynamic RAM (DRAM) and a static RAM (SRAM), storing computer-readable instructions executable by processing device. In general, memory may include any suitable non-transitory computer readable storage medium storing computer-readable instructions executable by processing device for performing the operations described herein. In some examples, computer system may include two or more memory devices (e.g., dynamic memory and static memory).

Computer system may include communication interface device, for direct communication with other computers (including wired and/or wireless communication), and/or for communication with network. In some examples, computer system may include display device (e.g., a liquid crystal display (LCD), a touch sensitive display, etc.). In some examples, computer system may include user interface (e.g., touchscreen, keyboard, an alphanumeric input device, a cursor control device, etc.).

In some examples, computer system may include data storage device storing instructions (e.g., software) for performing any one or more of the functions described herein. Data storage device may include any suitable non-transitory computer-readable storage medium, including, without being limited to, solid-state memories, optical media and magnetic media.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, Software applications or code) include machine instructions for a programmable processor, and may be implemented in a high-level procedural and/or object-oriented programming language, and/or in assembly/machine language.

As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal.

The term "machine-readable signal" refers to any signal used to provide machine instructions and/or data to a programmable processor.

To provide for interaction with a user, the systems and techniques described here may be implemented on a computer having a display device for displaying information to the user and a U.I. touchscreen, stylus pencil, voice command, keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or frontend components.

The components of the system may be interconnected by any form or medium of digital data communication (e.g., a communication network). Examples of communication networks include a local area network ("LAN"), a wide area network ("WAN"), and the Internet. The computing system may include clients and servers. A client and server are generally remote from each other and typically interact through a communication network. The relationship of client and server arises by virtue of computer programs running on the respective computers and having a client-server relationship to each other. A number of embodiments have been described. Nevertheless, it will be understood that various modifications may be made without departing from the spirit and scope of the invention.

While illustrative embodiments have been described herein, the scope thereof includes any and all embodiments having equivalent elements, modifications, omissions, combinations (e.g., of aspects across various embodiments), adaptations and/or alterations as would be appreciated by those in the art based on the present disclosure. For example, the number and orientation of components shown in the exemplary systems may be modified.

The following claims, including any amendments thereof, define what is claimed as the invention:

1. A computer-implemented method, comprising:
using differential privacy to anonymize network traces comprising the following steps:
(i) implementing a prefix-preserving technique to anonymize IP addresses of network traffic data, said prefix-preserving technique comprising permuting n leading digits as a network part, and for remaining digits clustering addresses into K clusters as a host part; and randomizing addresses within each of said K clusters;
(ii) implementing a per class differential privacy mechanism comprising conditional privacy measuring privacy of anonymized traffic data, wherein said measuring depends on mutual information between raw and anonymized records at a certain confidence level, wherein information loss is related to a mismatch amount among records before and after, wherein conditional privacy is based on differential entropy of a random variable, wherein the differential entropy of A given B=b is $$h(A|B) = \int_{\Omega_{A,B}} f_{A,B}(a,b) \log_2 f_{A|B=b}(a) da\, db \quad (1)$$

where A is a random variable that describes the data, and B is a variable that gives information on A, wherein $[\![Q]\!]\_(A,B)$ identifies a domain of A and B, wherein average conditional privacy of A given B is $$\Pi(A|B) = 2^{h(A|B)} \quad (2)$$

wherein if D_i is an attribute value of the original data and D_i' is the value after anonymization, then conditional privacy for anonymizing the attribute is $$2^{h(D_i|D_i')} \text{ where } h(D_i|D_i')$$

is the conditional entropy of the original data given the anonymized data, and conditional privacy is calculated and averaged over all attributes;
(iii) utilizing differential privacy in a condensation method comprising clustering records based on features of network trace data, partitioning said network trace data into three clusters, wherein each cluster has packets or flows with similar features, and computing mean values of these features and adding Laplace noise to the mean values to obtain perturbed mean values, and replacing said mean values with said perturbed mean values;
wherein the method does not add any burden to a data analyser, and wherein said Data analyser analyzes network traffic data without modification;
wherein the method is performed on a computing device having memory and a hardware processor, and programming instructions saved to the memory and executable on the hardware processor for performing the steps to effect the methods steps.

2. A computer-implemented system for performing the methods herein, comprising: a computing device having a memory and a hardware processor and program instructions saved to the memory and executable by the processor for running an application configured to perform the method steps of claim 1.

* * * * *